United States Patent [19]

Reich et al.

[11] 4,449,038
[45] May 15, 1984

[54] APPARATUS FOR WELDING A JOINT BETWEEN PLASTIC PIPES

[75] Inventors: Fritz Reich; Alfred Thalmann, both of Uhwiesen, Switzerland

[73] Assignee: George Fischer Ltd., Switzerland

[21] Appl. No.: 394,769

[22] Filed: Jul. 2, 1982

Related U.S. Application Data

[62] Division of Ser. No. 242,301, Mar. 10, 1981, Pat. No. 4,365,144.

[30] Foreign Application Priority Data

Mar. 10, 1980 [CH] Switzerland ............. 1850/80

[51] Int. Cl.³ ............................................. H05B 3/58
[52] U.S. Cl. ............................. 219/535; 156/304.2; 156/379.7; 156/274.2; 219/528; 219/544; 285/21
[58] Field of Search ............... 219/528, 535, 541, 544, 219/549; 156/274.2, 275.1, 304.2, 304.5, 379.7, 380.1, 380.9, 499; 174/84 S; 285/21, 22, 286; 264/27, 272; 428/256

[56] References Cited

U.S. PATENT DOCUMENTS

| 3,393,297 | 7/1968 | Hart | 219/528 |
| 3,506,519 | 4/1970 | Blumenkranz | 219/544 |
| 3,930,634 | 3/1960 | Merritt | 285/21 |
| 3,987,276 | 10/1976 | Vogelsanger et al. | 219/535 |
| 4,096,017 | 6/1978 | Wyke et al. | 156/275.1 |
| 4,147,926 | 4/1979 | Stähli | 219/535 |

FOREIGN PATENT DOCUMENTS

| 351595 | 4/1922 | Fed. Rep. of Germany | 219/535 |
| 2340965 | 2/1975 | Fed. Rep. of Germany | 219/535 |
| 2721340 | 12/1975 | Fed. Rep. of Germany | . |
| 51-8630 | 1/1976 | Japan | 219/535 |
| 570577 | 11/1978 | Switzerland | . |

Primary Examiner—Volodymyr Y. Mayewsky
Attorney, Agent, or Firm—Roylance, Abrams, Berdo & Goodman

[57] ABSTRACT

A welded joint for plastic pipe is formed by apparatus including a sleeve (6) which is placed over the place where the pipes are joined and a heating mat (3) which is inserted between the sleeve and the pipes. The heating mat (3) and the sleeve (6) are provided with geartooth system (4, 5, 114, 115) which engage each other in the assembled condition of the device. Consequently, the surfaces of the ends of the heating mat (3) and the sleeve (6) which are in contact are circumferentially extended, resulting in a satisfactory welded joint, even where large pipe tolerances are involved.

6 Claims, 8 Drawing Figures

APPARATUS FOR WELDING A JOINT BETWEEN PLASTIC PIPES

This is a division of application Ser. No. 242,301, filed Mar. 10, 1981, now U.S. Pat. No. 4,365,144.

This invention relates to an apparatus for forming a welded joint between the abutting ends of thermoplastic pipes.

BACKGROUND OF THE INVENTION

A welded joint by means of which a branching of pipe can be produced is known from Swiss Pat. No. 570,577. To produce the joint in accordance with this patent, a pipe connection resting on a saddle is placed on an existing pipe and the entire saddle is welded to the pipe by means of a heating knot. Thereafter, the pipe is drilled out in the area of the opening of the connecting pipe.

A connecting sleeve for plastic pipes which includes a wide strip bent into a cylinder is known from German Pat. No. 2,721,340. On the ends of the strip, which are adjacent to each other, the sleeve carries clamping devices by means of which it can be clamped firmly to a pipe joint. A permanent connection is produced by cementing the sleeve to the ends of the pipe. After the cement has hardened, the clamping device can be removed in order to obtain a simple form of joint.

With a welded joint made in accordance with the above Swiss patent, in which the clamping ring to be placed on an intact pipe as described therein is used, and in which complete tightness over the entire circumference of the pipe is not necessary, a gap would occur, depending upon existing tolerances, which might result in a defect in the welding if it was used to join two pipes at the adjacent ends of the heating mat. The method disclosed in the above German patent can not be used with pipelines which are subject to great mechanical, thermal or chemical stresses, since contact cementing has less resistence capability than a weld.

U.S. Pat. No. 4,096,017 shows a welded joint for plastic-coated pipes in which the pipe ends are welded together without the plastic coating in a conventional manner after which the pipe is again provided with a plastic coating by use of a plastic mat. The joint with the existing plastic coating is achieved by welding the overlapping mat by means of a resistance wire inserted between the mat and the coating. This procedure for producing a permanent coating of the welded joint connecting the pipes is not intended for use informing a direct, tight joining of plastic pipes themselves.

BRIEF DESCRIPTION OF THE INVENTION

An object of the present invention is to provide a welded joint for plastic pipes which insures satisfactory tightness integrity and sturdiness, even if pipe tolerances are large, and wherein the joint is easy to produce.

Briefly described, the invention includes an improved apparatus for welding together the abutting ends of two coaxially aligned plastic pipes, the apparatus being of the type including a heating mat having heating wire therein, the mat being wrappable around the pipes so as to encircle the abutment thereof with the ends of the mat substantially meeting at one side of the pipes, and a generally cylindrical, C-shaped sleev placeable around the mat with the ends thereof defining a slit, the sleeve being subjectable to clamping forces in the direction of reduction of its circumference, the improvement wherein the mat includes means defining end portions of different lengths so that said end portions interengage each other at the side where they meet, and said sleeve includes means defining end portions of different lengths so that said end portions interengage each other to define a nonlinear slit.

In another aspect, the invention includes an apparatus to be employed in substantially the same environment wherein the mat and the sleeve include end portions which overlap each other when said mat and sleeve encircle said pipes.

When the above indicated features of the welded joint of the invention are employed, no longitudinally-continuous unwelded areas or seams can occur, and it is therefore possible to use the apparatus even with large diameter pipe and with pipes having rather larger diameter tolerances. Thus, one is assured of obtaining a tight, firm pipe joint even with such pipes.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
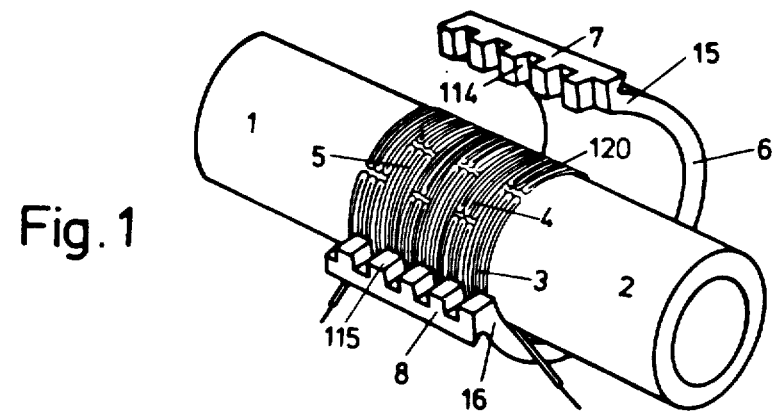
FIG. 1 is a perspective view of portions of pipes to be joined with an apparatus in accordance with the present invention, partly assembled.

Referring now to the drawings in detail, it will be seen that FIG. 1 shows a pipe joint in a partially assembled condition. End portions of two pipes 1 and 2 are coaxially aligned with each other and brought together so that the ends thereof are in abutment, after which a heating mat 3 is wrapped around the abutment location where the two pipe ends are together. The ends of the heating mat are formed with alternating portions of different length so that, when viewed in plan, the are castellated to resemble the teeth of a gear. The long and short portions on opposite ends of the mat are of similar width and are offset from each other so that three castellated end portions interengage or interlock with each other to form a sheath in such a way that does not permit any gap which extends longitudinally, with respect to the pipe, over the entire width of the heating mat 3 which otherwise could result in a defect in the subsequent welding, especially if tolerances are rather larger. After application of the mat, a sleeve 6 is placed around the heating mat which sleeve has end portions 15 and 16 with castellations 114 and 115 formed thereon on the surfaces which face each other, the castellations 114, 115 being somewhat similar in appearance to the gears of a rack and being offset so that they engage with each other when the sleeve is in the completely assembled condition. As will be recognized, sleeve 6 is continuous except for the separation at the end portions and can be viewed as a C-shaped structure. When the structures are assembled as shown in FIG. 1, the interlocking castellations 4, 5 of the mat and the interlocked castellations 114, 115 of the sleeve are angularly offset from each other by an angle of at least 15° or at least 20 millimeters around the circumference of the pipe to prevent the possibility of the meeting portions thereof from occuring at the same place, this offset acting to prevent an increase in the probability of failure to hold in the event that one theoretically or potentially weak portion is plced over another. In contrast with simple contact surfaces, the welded surfaces are considerably increased by the castellated systems when the pipes are abutted together.

Figure 2:
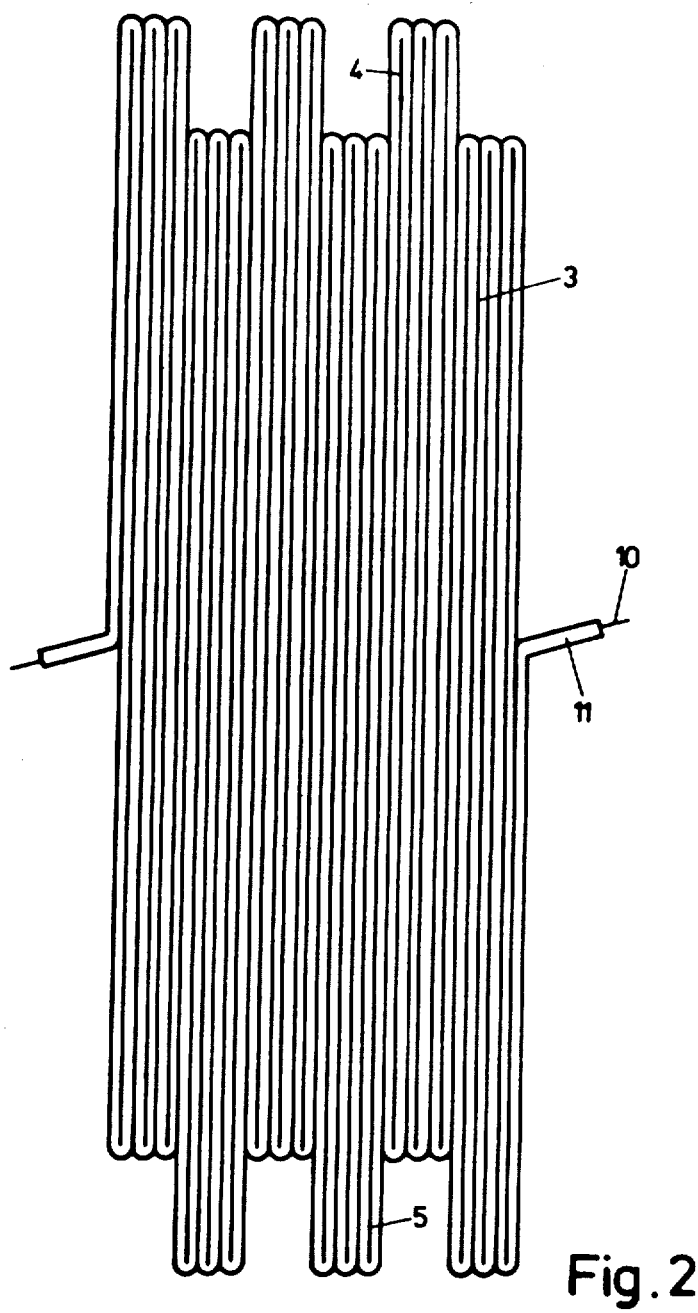
FIG. 2 is a plan view of a heating mat usable in the apparatus of FIG. 1, shown in its rolled-out condition.
Figure 5:
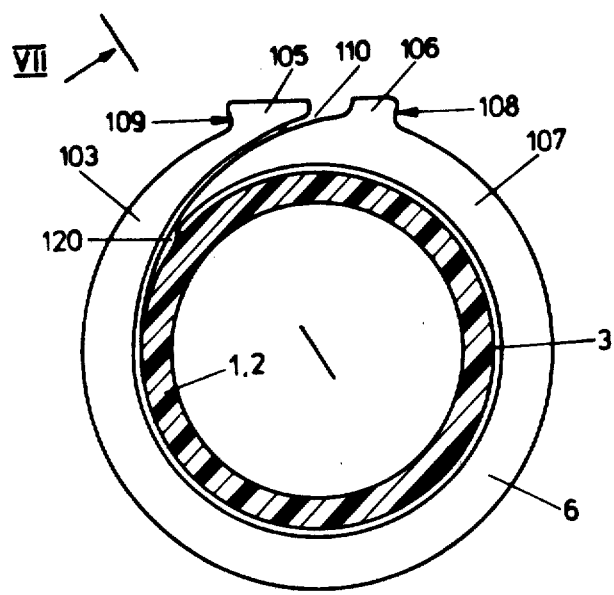
FIG. 5 is a transverse sectional view of a further embodiment of a pipe joint in accordance with the invention.

FIG. 2 shows a heating mat 3 in its unrolled condition, the mat being formed of a zig-zag arrangement of a piece of heating wire 10. As will easily be seen, the gear-tooth systems 4, 5, can be easily be produced by laying the heating wire 10 appropriately without any special working or cutting. However, a finished mat, which must be made of insulated heating wire in order to eliminate the possibility of electrical short circuits, is more favorable to performing the work easily and quickly. It is highly desirable to select, as a material for the insulated coating 11, the same material, or a related composition, as that from which the parts to be welded together are made because the insulating coating serves as the purveyor of the fusion.

The two projecting ends of the heating wire 10 protrude from beneath the sleeve in the completely assembled condition of the joint structure and are connected with a source of current by clamps or plug-in connection.

In the welded condition, the heating mat performs another function, that is, the function of forming a kind of sheathing for the joint. The areas 120 (FIG. 1) are relatively small hollow spaces which are filled by displacement of the insulating material during welding.

Figure 3:
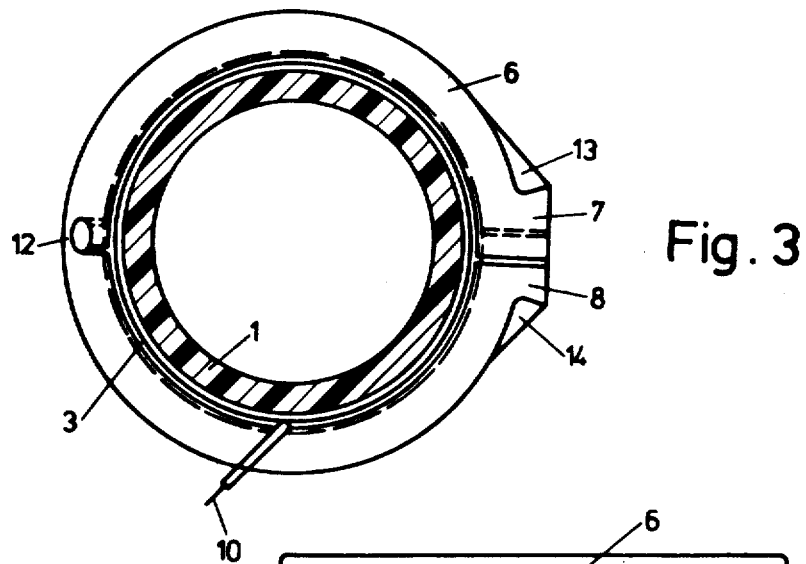
FIG. 3 is a transverse sectional view through a completely assembled, but not yet welded, pipe joint in accordance with the invention.

FIG. 3 shows a transverse sectional view through the completely assembled pipe joint before welding takes place. The heating mat 3 is wrapped around the pipe 1 and the sleeve 6 is closed around the heating mat. The ends of the heating wire 10 protrude from beneath sleeve 6.

As seen in FIG. 3, the C-shaped sleeve includes a film hinge 12 which permits the two semicircular major portions of the sleeve to be opened in the manner of jaws to permit the sleeve to be easily installed over the mat. The end portions of the sleeve include compression arms 7 and 8 on which the castellated portions are formed. When a flexible material is used for the entire sleeve 6, the hinge can be dispensed with.

When the two compression arms 7 and 8 are joined together, their cross section is generally trapezoidal in shape and in that way they form two channels with other parts of the sleeve which make it possible by means of a clamping device, such as a tension clamp for example to press the sleeve firmly against the pipe ends until the welding is completed. To strengthen them, the clamping arms 7, 8 have strengthening ribs 13 and 14 which are provided to ensure that the tension clamp gains a firm grip.

Figure 4:
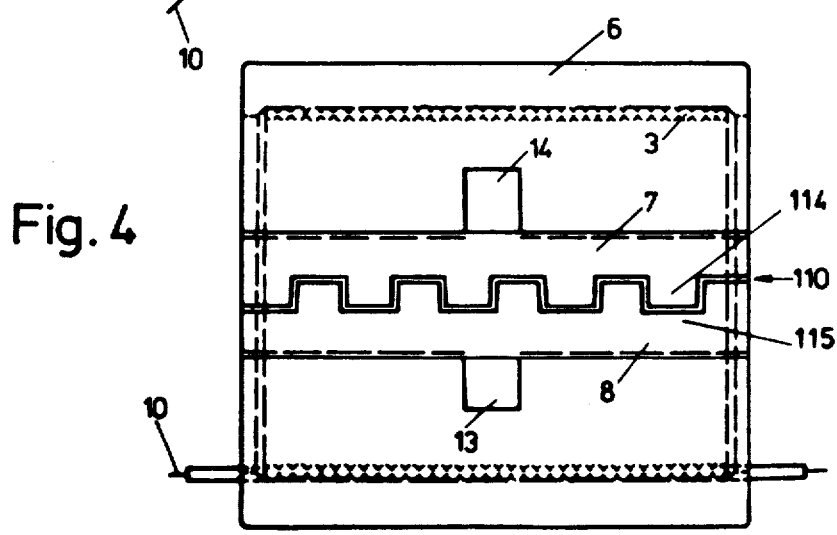
FIG. 4 is a side elevation of the joint of FIG. 3.

FIG. 4 shows a side elevation of the pipe joint of FIG. 3 and illustrated the interengaged portions of the teeth 114, 115, the two arms 7, 8 and the ribs 13, 14, as well as the slit 110 which is defined between the castellated teeth and which therefore follows a nonlinear course.

In the completely assembled condition, the wire ends 10 are connected to a regulating transformer or a thyristor control circuit to control the magnitude of the voltage and/or the current applied to the heating wire. As a result of the heat generated by current flowing through the wire, the surfaces of the pipes and the sleeve 6 pressed together with the clamping claw are welded with the insulation of the heating mat 3. The welding time can be regulated by an adjustable timer. After partial cooling, the tension clamp is removed to give the particles of the welded material an opportunity to release any possible inner tension.

By employing measured quantities of the tension clamp's bearing pressure, the heating power and the heating temperature, the mobility or fusion of the plastic molecules can be regulated in measured quantities. The tension clamp can have an adjustable spring or tongue for this purpose.

The method of the present invention has the advantage that large pipe tolerances and surface defects at the end of the pipes, as well as uneven cuts, can be circumvented without affecting the stability of the joint.

When materials with large shrinkage affects when welded are used, the shrinkages can be largely be compensated for by longer prestressing processes, similar to dwell pressure procedures in injection molding.

FIGS. 5–8 show a second embodiment of the invention in which the sleeve 6 includes end portions 103, 104 which taper to a relatively thin edge and which have joining surfaces 112, 113, the remainder of the sleeve except for the tapered portion being of substantially uniform thickness. The two tapering ends 103, 104 overlap each other when the sleeve is closed and are pressed together by two axially extending clamping jaws 106, 107 formed on the exterior surface of the sleeve as illustrated. The direction of the clamping force is illustrated by the arrows 108, 109 in FIG. 5, and this clamping force can be provided by any conventional device, not illustrated, so that the sleeve fits tightly around pipes 1, 2. As in the previous embodiment, a heating mat 3 is placed between the sleeve 6 and the pipes 1, 2 so that it completely surrounds the pipes. However, in the embodiment of FIGS 5–8, the sleeve surrounds the pipe and then extends upwardly between the ends 103, 104 of the sleeve in slat 110. The welding surfaces are shaped as if the sleeve when lying flat, had been cut through axially at a small angle to its surface with the joining surfaces 112, 113 being larger than the surface when the are abutted together.

In this way, both the sleeve 6 and the pipes 1, 2, and also the ends 103, 104 of the sleeve are welded together in one operation.

Figure 6:
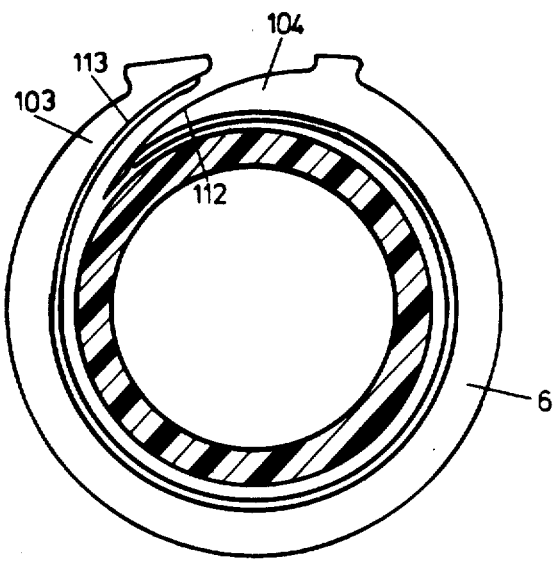
FIG. 6 is a transverse sectional view similar to FIG. 5 but before welding.

FIG. 6 shows the sleeve 6 partially open with the ends 103, 104 of the sleeve apart from each other so that the entire sleeve can be longitudinally slipped over the ends of the pipes.

Figure 7:
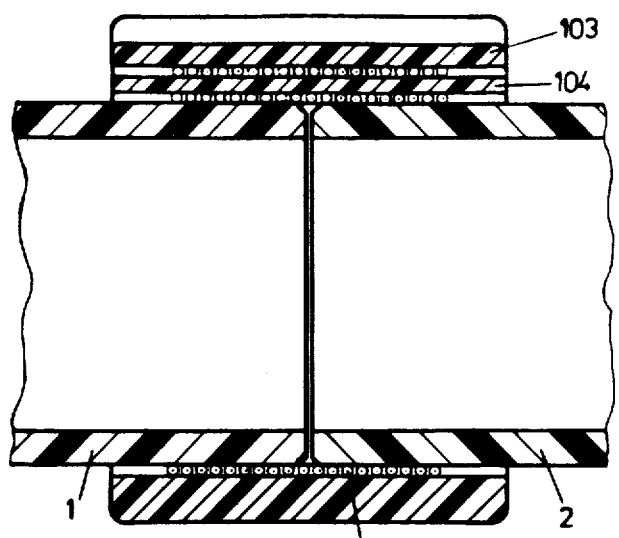
FIG. 7 is a longitudinal sectional view of along line VII—VII of FIG. 5.

FIG. 7 shows a longitudinal section through the sleeve 6 and the ends 1 and 2 of the pipes with the heating mat 3 having one layer over the major part of the circumference of pipes 1 and 2 around the abuttment location and two layers in the area where the two parts 103, 104 of the sleeve overlap each other.

Figure 8:
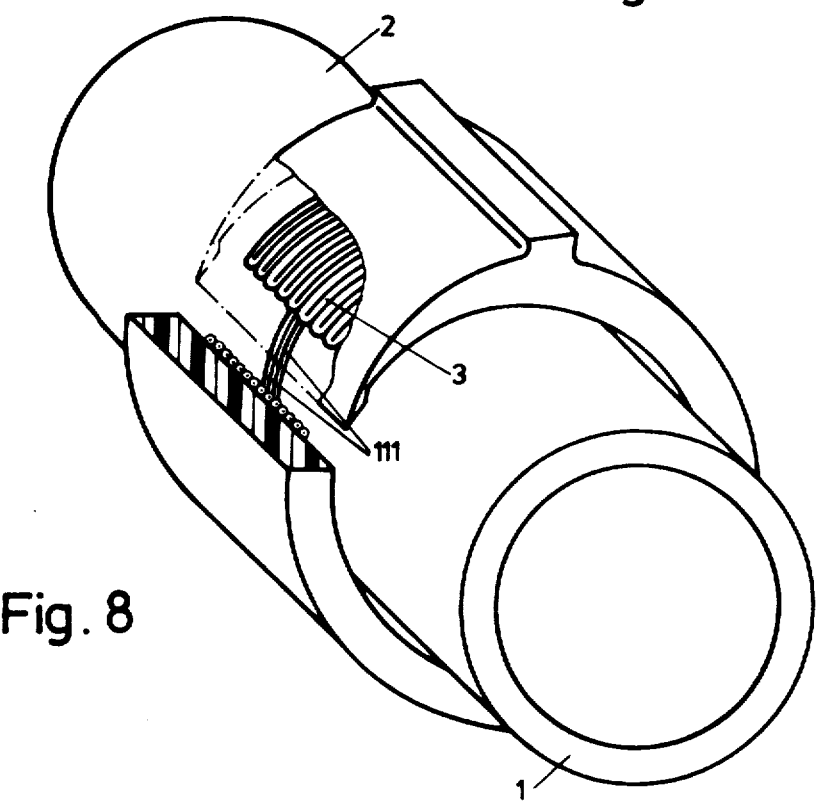
FIG. 8 is a perspective view, partially cutaway, of a joint formed in accordance with FIGS. 5–7.

FIG. 8 shows a perspective view of the sleeve after the welding is completed, a portion of the end 103 of the sleeve being partially being cutaway. The heating mat 3 has connections 111 which are brought at a place between the sleeve and that end of the pipe which is at a distance from one place where the two parts of the sleeve which are to be welded are connected. The heating mat 3, which is visible because of cutting-away portions of the sleeve, is longer than the circumference of the abutting ends of the pipes and overlaps itself at an angle, but with no contact of the part passing over the entire circumference with the part next to the pipe. A small hollow space is formed at the point where the overlapping takes place, and this space is filled up during the welding process by displacement of the welded material. As a result of the structure of the joining surfaces 112, 113, a tangential sliding of the corresponding sleeve ends 103, 104 is ensured which makes the reduction of the circumference during the welding possible.

A reduction of the circumference is also ensured during the welding process in the embodiment of the invention shown in FIGS. 1–4 if the zigzag-shaped shot 110 between the castellations 114, 115 is sufficiently large before the welding takes place.

While certain advantageous embodiments have been chosen to illustrate the invention it will be understood by those skilled in the art that various changes and modifications can be made therein without departing from the scope of the invention as defined in the appended claims.

What is claimed is:

1. An improved apparatus for welding together the abutting ends of two coaxially aligned plastic pipes, the apparatus being of the type including a heating mat having heating wire therein, said mat being wrappable around the pipes so as to encircle the abutment thereof with the ends of the mat substantially meeting at one side of the pipes, and a generally cylindrical, C-shaped sleeve of plastic material placeable around the mat with the ends thereof defining a slit, the sleeve being subjectable to clamping force in the direction of reduction of its circumference, the improvement wherein
said mat includes means defining end portions of different lengths so that said end portions interengage each other at the side where they meet; and
said sleeve includes means defining end portions of different lengths so that said end portions interengage each other to define a nonlinear slit.

2. An apparatus according to claim 1 wherein said end portions of said sleeve are substantially uniformly castellated, the castellations being offset from each other so that they interengage each other.

3. An apparatus according to either of claims 1 or 2 wherein said end portions of said mat are substantially uniformly castellated, the castellations being offset from each other so that they interengage.

4. An apparatus according to claim 3 wherein said slit between the end portions of said sleeve are angularly offset, with respect to the pipe circumference, from the meeting location of the end portions of said mat.

5. An apparatus according to claim 4 wherein said angular offset is at least 15° or at least 20 millimeters measured along the circumference.

6. An apparatus according to claim 3 wherein said means defining said end portions of said sleeve includes
radially outwardly protruding shoulders to which clamping force can be applied in the direction of reducing the circumference encompassed by said sleeve.

* * * * *